Aug. 6, 1940.  L. E. CLOUGH  2,210,833
SEALING GASKET
Filed Oct. 28, 1937
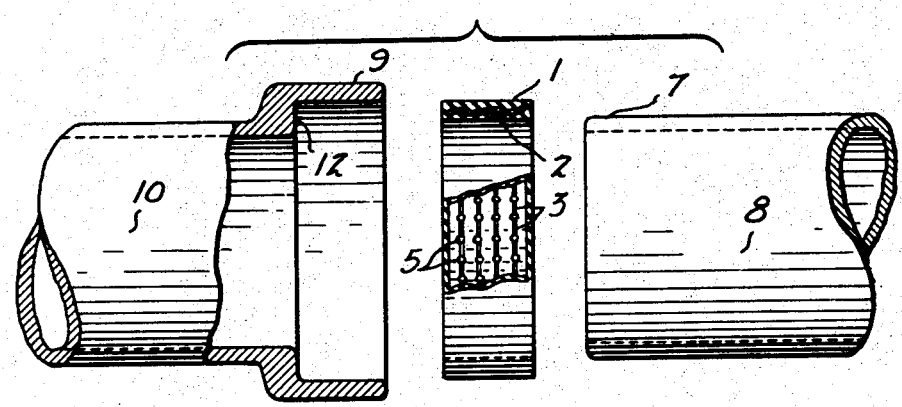
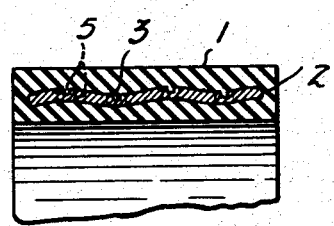
Fig. 1
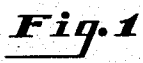
Fig. 2  Fig. 3
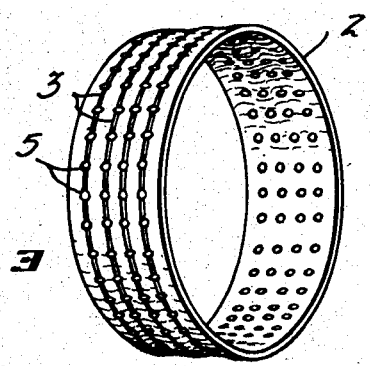
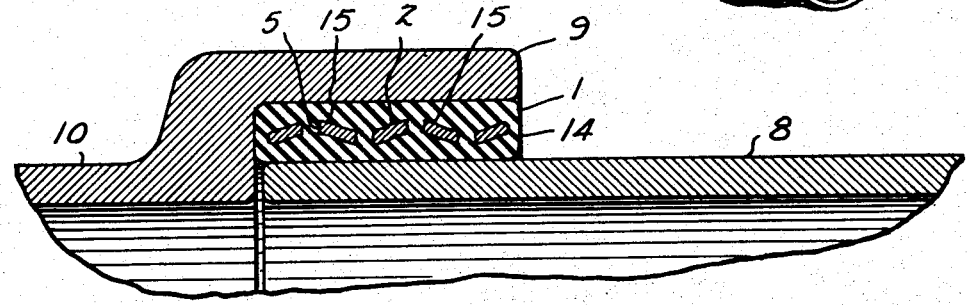
Fig. 4
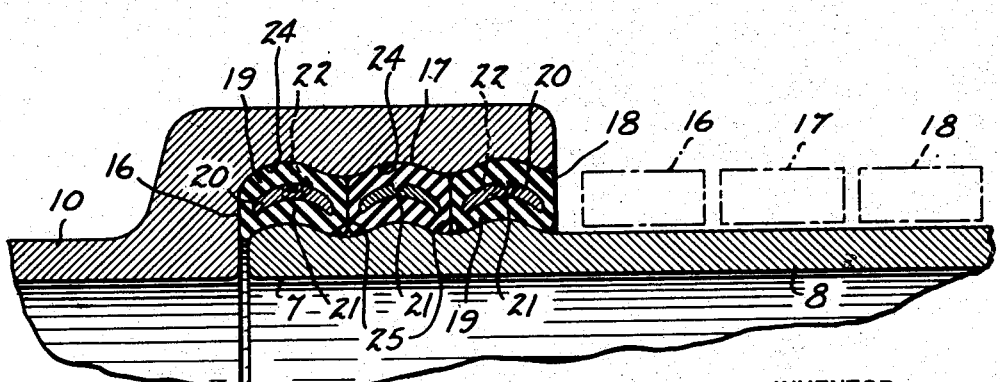
Fig. 5
INVENTOR
Lee E. Clough
BY
Evans + McCoy
ATTORNEYS Patented Aug. 6, 1940

2,210,833

UNITED STATES PATENT OFFICE 2,210,833

SEALING GASKET

Lee E. Clough, Akron, Ohio, assignor to The General Tire & Rubber Company, Akron, Ohio, a corporation of Ohio Application October 28, 1937, Serial No. 171,455

2 Claims. (Cl. 288—2)

This invention relates to sealing gaskets and more particularly to molded gaskets having self-contained means for holding the gaskets in position.

An object of the invention is to provide an improved, resilient gasket that maintains a positive seal when subjected to mechanical shock and limited relative displacement.

Another object is to provide such a gasket for use in connecting vitrified pipe and the like and which is resistant to acids and other corrosive materials used in the chemical industries.

Another object is to provide a sealing gasket that is simple in design and construction and inexpensive to manufacture and one which is adapted to effect a seal between uneven and irregular surfaces.

Other objects and advantages will become apparent from the following detailed description of a suitable embodiment of the invention which is made in connection with the accompanying drawing, in which Figure 1 is an expanded view partly in section and with parts broken away showing a gasket embodying the invention and the mating ends of pipe sections to be joined;

Fig. 2 is a fragmentary longitudinal sectional view showing the construction of the sealing gasket illustrated in Fig. 1 and enlarged with respect thereto;

Fig. 3 is a perspective view of the deformable core of the gasket;

Fig. 4 is a fragmentary detail assembly view, in section, showing the sealing gasket in place between the pipe sections; and Fig. 5 is a view similar to Fig. 4 showing a modification of the invention in which the gasket is made in separable annular sections and the opposed pipe surfaces are formed with complementary annular grooves and ridges.

According to the present invention, a resilient body portion of the gasket is compressed or compacted, and maintained in fluid sealing contact with the pipe or between objects to be sealed by means of a deformable member which is capable of taking and retaining a relatively permanent set. Referring to the drawing by numerals of reference, which indicate like parts throughout the several views, the invention is shown embodied in an annular cylindrical gasket for sealing the bell and spigot joint between successive length of pipe. The gasket comprises a cushioning and fluid sealing body portion I of deformable resilient material such as rubber or the like. In the event that rubber is employed it is preferred that it be charged with a quantity of paraffine during compounding to render it resistant to corrosive material. Various quantities of paraffine can be successfully used, but I have found under 15%, preferably about 5%, to give satisfactory results.

Associated with the body portion of the gasket is a deformable core member 2 that is capable of substantially retaining a permanent set. Preferably the core is formed of a material such as lead which has a minimum of elasticity and is relatively easy to deform in establishing a seal with the gasket.

The core member is in the form of a substantially cylindrical sleeve which is preferably substantially embedded within the resilient body I and substantially coextensive therewith. A series of circumferentially extending grooves 3 may be formed on the core member to provide suitable bending areas that yield upon the application of longitudinal or endwise compressive forces to the gasket.

A number of apertures or openings 5 may be formed in the core member so that the resilient body portion I may be interlocked with the core. Thus, the body I is integral and continuous on both sides of the core and extends through the openings 5 to secure the several parts of the gasket together. These openings reduce the resistance of the core to endwise or longitudinal stresses. If desired, enough openings 3 may be employed so that the core is sufficiently weakened thereby to dispense with the use of circumferential grooves 3.

In assembling the pipe sections the annular gasket is placed on spigot end 7 of pipe section 8. If desired, the inside diameter of the gasket may be slightly less than the spigot so that it has frictional engagement with the spigot section sufficient to prevent the gasket from sliding of its own weight relative to the pipe if the pipe is vertical, but insufficient to effect a fluidtight seal therewith.

The spigot end 7 of the pipe section 8 with the gasket thereon is inserted into bell 9 of pipe section 10 so that the gasket abuts against an annular shoulder 12 at the base of the bell 9 and is confined in an annular space between the spigot 7 and bell 9.

The assembly of the pipe joint is facilitated if the rubber gasket is first wetted, since the water serves as a lubricant for the rubber and permits sliding between the gasket and the material of the pipe sections. Endwise or longitudinal pressure applied along exposed edge 14 of the gasket and preferably circumferentially thereof distorts the core 2, causing a buckling thereof so that annular flutes 15 are formed by bending of the core along the circumferentially extending bending zones or grooves 3. Desirably, the core member is initially formed with relatively shallow flutes, as shown in Fig. 2, so that subsequent deformation of the core member to effect a fluidtight seal may be accomplished with less endwise pressure than would otherwise be required.

The core member 2 substantially retains the deformation or set imparted thereto by the compressive force applied to the exposed edge 14 of the gasket so that the seal effected is substantially permanent.

The bending zones afforded by the annular grooves 3 and the openings 5 in the core member 2 may be made with different degrees of rigidity to suit particular installation requirements.

The resilience and elasticity of the inner and outer layers or portions of the gasket body when interposed between the core member 2 and the spigot and bell act as cushions for the absorption of limited mechanical shock and are effective to maintain the seal upon slight displacement of the parts.

Figure 5 illustrates a modification of the invention in which the gasket is made up in separable annular sections 16, 17 and 18. Each section comprises a resilient cushioning body portion 19 similar to the body portion and previously described in connection with the preceding figures, and a deformable annular core 20. The cores 20 are imbedded in the body portions 19 as previously described, and are each provided with a central circumferentially extending groove 21 to afford an annular bending zone. Also, spaced openings 22 may be formed in the cores 19 to permit the rubber of the body portion to extend therethrough, thus integrally joining the portions of the rubber body on both sides of the core. In assembling a pipe joint with the gasket illustrated in Fig. 5 the central sections of the gasket are first placed on the spigot end as indicated in outline by the broken line figures. The spigot end 7 of the pipe section 8 is then introduced into the bell 9 of the pipe section 10 and the gaskets forced into place, one at a time. In this manner each section of the gasket is individually positioned and the deformation of each core 20 occurs independently of the others. Accordingly, the degree of deformation of each portion of the gasket core may be controlled independently of the other portions so that an improved pipe joint of maximum sealing efficiency is produced. Desirably, the opposed annular faces of the bell and spigot which define the gasket-receiving chamber are formed with annular grooves 24 and 25 respectively. Preferably the grooves are formed so that when the pipe sections are assembled the internal grooves 25 of the bell are in staggered relation with respect to the external grooves 25 of the spigot, so that the annular gasket-receiving chamber between the two pipe ends is substantially uniform in thickness from end to end of the bell.

The present invention is thus seen to provide a gasket having a resilient and elastic body portion which encloses means adapted to substantially permanently retain a set given thereto and maintain the resilient body portion in sealing engagement with the surrounding walls of the joint to be sealed. The gasket is effective to maintain the fluid seal even when the joint is subjected to mechanical shock and slight relative movement of the joint parts. Slight flowing or movement of the elastic body portion 1 of the gasket is permissible since the effect of the core member 2 is to press the elastic material of the body into fluid-sealing engagement with the walls of the joint.

Other modes of applying and utilizing the principles of the invention, including alterations in both the parts and method of assembly may be employed, change being made as regards the details described, it being understood that the particular form shown and the procedure set forth are presented for purposes of explanation and illustration.

What I claim is:

1. A gasket comprising a cushioning body portion, a core embraced by the body portion and adapted to substantially retain a permanent set and arranged, upon deformation, to distort the body portion, said core being substantially coextensive with the body portion and grooves on the core to provide localized bending zones.

2. A gasket comprising a thin annular soft metal core, a cushioning body enveloping the core, portions of the body material extending through openings in the core to interlock the core and body, the core adapted to substantially retain deformation for keeping a fluid-sealing distortion imparted to the gasket, and annular areas of the core weakened to provide bending zones for facilitating deformation of the gasket.

LEE E. CLOUGH.